(12) United States Patent
Udell, III

(10) Patent No.: US 9,542,920 B2
(45) Date of Patent: Jan. 10, 2017

(54) MODULAR WIRELESS SENSOR NETWORK FOR MUSICAL INSTRUMENTS AND USER INTERFACES FOR USE THEREWITH

(71) Applicant: University of Florida Research Foundation, Incorporated, Gainesville, FL (US)

(72) Inventor: Chester James Udell, III, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 14/993,360

(22) Filed: Jan. 12, 2016

(65) Prior Publication Data

US 2016/0125864 A1   May 5, 2016

Related U.S. Application Data

(62) Division of application No. 14/118,014, filed as application No. PCT/US2012/040723 on Jun. 4, 2012, now Pat. No. 9,269,340.

(60) Provisional application No. 61/494,087, filed on Jun. 7, 2011.

(51) Int. Cl.

| | |
|---|---|
| *G10H 1/18* | (2006.01) |
| *G10H 1/00* | (2006.01) |
| *H04W 4/00* | (2009.01) |
| *G10H 1/02* | (2006.01) |
| *G06K 9/00* | (2006.01) |
| *H04W 84/18* | (2009.01) |

(52) U.S. Cl.
CPC ............ *G10H 1/18* (2013.01); *G06K 9/00335* (2013.01); *G10H 1/0008* (2013.01); *G10H 1/0083* (2013.01); *G10H 1/0091* (2013.01); *G10H 1/02* (2013.01); *H04W 4/005* (2013.01); *G06K 2209/27* (2013.01); *G10H 2220/201* (2013.01); *G10H 2220/391* (2013.01); *G10H 2220/395* (2013.01); *G10H 2240/211* (2013.01); *H04W 84/18* (2013.01)

(58) Field of Classification Search
CPC ....................................................... G10H 1/18
USPC ................................................... 84/615, 653
See application file for complete search history.

(56) References Cited

U.S. PATENT DOCUMENTS

| | | | | |
|---|---|---|---|---|
| 4,905,560 A | * | 3/1990 | Suzuki ..................... | G10H 1/00 338/174 |
| 5,315,057 A | * | 5/1994 | Land ..................... | G10H 1/0025 84/601 |
| 5,837,914 A | * | 11/1998 | Schwartz ................. | G10H 1/26 84/603 |
| 6,415,439 B1 | * | 7/2002 | Randell ................... | H04L 67/12 348/61 |

(Continued)

FOREIGN PATENT DOCUMENTS

WO    2006133207 A2    12/2006

*Primary Examiner* — David Warren
(74) *Attorney, Agent, or Firm* — Saliwanchik, Lloyd & Eisenschenk

(57) ABSTRACT

A wireless sensor network for musical instruments is provided that will allow a musician to communicate natural performance gestures (orientation, pressure, tilt, etc) to a computer. User interfaces and computing modules are also provided that enable a user to utilize the data communicated by the wireless sensor network to supplement and/or augment the artistic expression.

10 Claims, 9 Drawing Sheets

(56) References Cited

U.S. PATENT DOCUMENTS

| | | | | |
|---|---|---|---|---|
| 6,919,503 B2 * | 7/2005 | Nishitani | ............. | G10H 1/0058 84/633 |
| 7,339,107 B2 * | 3/2008 | Remignanti | ......... | G10H 1/0091 84/723 |
| 7,667,129 B2 * | 2/2010 | Chidlaw | ............. | G10H 1/0091 84/723 |
| 7,839,269 B2 * | 11/2010 | Steger | ................ | A63B 71/0686 340/407.1 |
| 8,111,241 B2 * | 2/2012 | Weinberg | ................ | G06F 3/017 345/158 |
| 8,653,350 B2 * | 2/2014 | Takahashi | ................ | G10H 1/34 84/615 |
| 9,269,340 B2 * | 2/2016 | Udell, III | ............. | G10H 1/0091 |
| 2003/0070537 A1 * | 4/2003 | Nishitani | ............. | G10H 1/0058 84/633 |
| 2004/0209629 A1 * | 10/2004 | Virolainen | ........... | G10H 1/0066 455/466 |
| 2005/0211068 A1 | 9/2005 | Zar | | |
| 2006/0272489 A1 * | 12/2006 | Remignanti | ......... | G10H 1/0091 84/723 |
| 2007/0169615 A1 * | 7/2007 | Chidlaw | ............. | G10H 1/0091 84/723 |
| 2007/0175321 A1 * | 8/2007 | Baum | ................ | G10H 1/0083 84/737 |
| 2007/0175322 A1 * | 8/2007 | Baum | ................ | G10H 1/0083 84/737 |
| 2007/0180977 A1 * | 8/2007 | O'Hara | ................ | G10H 3/146 84/377 |
| 2007/0186759 A1 * | 8/2007 | Bang | .................... | G10H 1/0041 84/723 |
| 2009/0027338 A1 * | 1/2009 | Weinberg | ................ | G06F 3/017 345/158 |
| 2009/0199698 A1 * | 8/2009 | Totaka | ..................... | G10H 1/40 84/611 |
| 2010/0022183 A1 * | 1/2010 | Ryle | ....................... | H04H 20/33 455/3.06 |
| 2010/0194684 A1 * | 8/2010 | Weil | ........................ | G06F 3/002 345/156 |
| 2011/0007666 A1 * | 1/2011 | Gurdan | ................ | G10H 1/0066 370/254 |
| 2011/0290097 A1 * | 12/2011 | Takahashi | ................ | G10H 1/34 84/622 |
| 2013/0112066 A1 * | 5/2013 | Mizuta | ................... | A63F 13/814 84/626 |
| 2013/0152768 A1 * | 6/2013 | Rapp | ...................... | G10H 3/125 84/634 |
| 2013/0262021 A1 * | 10/2013 | Sakurai | .................. | G01B 21/16 702/141 |
| 2013/0262024 A1 * | 10/2013 | Sakurai | ..................... | G01B 7/14 702/150 |
| 2014/0090547 A1 * | 4/2014 | Udell, III | ............. | G10H 1/0091 84/626 |
| 2015/0287395 A1 * | 10/2015 | Rapp | ...................... | G10H 3/125 84/422.1 |
| 2016/0019877 A1 * | 1/2016 | Remignanti | ......... | G10H 1/0066 84/645 |
| 2016/0114221 A1 * | 4/2016 | Binder | ................... | A63H 33/18 473/570 |
| 2016/0125864 A1 * | 5/2016 | Udell, III | ............. | G10H 1/0091 84/615 |

* cited by examiner

MODULAR WIRELESS SENSOR NETWORK FOR MUSICAL INSTRUMENTS AND USER INTERFACES FOR USE THEREWITH

CROSS-REFERENCE TO RELATED APPLICATIONS

This application is a divisional application of U.S. application Ser. No. 14/118,014, filed Nov. 15, 2013, which is a U.S. national stage application of International Application Serial No. PCT/US2012/040723, filed on Jun. 4, 2012, which claims the benefit of U.S. Provisional Application Ser. No. 61/494,087, filed Jun. 7, 2011, the disclosures of each of which are incorporated therein in its entirety, including any figures, tables, and drawings.

BACKGROUND

Throughout history, musical instruments have followed a process of co-evolution with developing technology to become what we know them as today. From the beginnings with sticks and bone, to cat-gut strings, to brass, to the piano-forte, and then to electronic synthesizers, musical instruments reflect the major technological breakthroughs of each time period.

As music technology continues to rapidly advance, the question of how acoustic instruments and traditional performance practice can be interfaced to current technological advancements must be continually re-evaluated and explored.

In the present age, the pervasiveness of computers, including mobile applications, is affecting music and other media technology. Having become invisibly interwoven into the fabric of our daily routine, developments in interactive computing have only begun to marginally affect conventional music instrument design and performance practice.

Attaching sensors to acoustic instruments to allow them to interact with sound using computers began with the hyperinstruments project at MIT. The hyperinstrument project was started in 1986 with the goal of designing expanded musical instruments, using technology to give extra power and finesse to virtuosic performers. The hyperinstruments were designed to augment guitars and keyboards, percussion and strings, and even conducting. A famous hyperinstrument application is the hypercello played by Yo-Yo Ma in the early 1990s. The hypercello allows the cellist to control an extensive array of sounds through performance nuance. The hypercello was an acoustic cello and a computer controlling synthesized sounds that accompanied the playing of the acoustic cello. Wrist measurements, bow pressure and position sensors, and left hand fingering position indicators enable the computer to measure, evaluate, and respond to a variety of aspects of the cellist's performance. The computer then controlled aspects of the sound of the cellist's performance. The sound of the performance was able to be affected by, in some cases, triggering and modifying the synthesized sounds that accompanied the acoustic cello.

Current trends in the Performance Arts, academic Computer Music conferences at national and international levels, and the gaming industry reveal a need for musicians to communicate gestural performance data of their musical instrument to a computer or other processing system. However, current literature in the field posits that the existing MIDI protocol, which utilizes the pitch-velocity-duration paradigm, has proven to be insufficient in representing the sensitive nuances that occur during live music performance.

BRIEF SUMMARY

Embodiments of the subject invention are directed to a wireless sensor network for musical instruments that will allow a musician to communicate natural performance gestures (orientation, pressure, tilt, etc) to a computer. User interfaces and computing modules are also provided that enable a user to utilize the data communicated by the wireless sensor network to support and control the artistic expression.

According to one aspect of the invention, composers and musicians are provided with a gestural means to interact with sound using physical gestures on their instrument of training.

The subject networks allow a musician to interact with components and controllers including, but not limited to, VST effects processing (e.g., distortion, delay, vocoding, etc.), algorithmic computer music processes, and stage lighting. In addition, certain embodiments of the subject wireless sensor network enable real musical instruments to become video game controllers or interactive devices.

Example applications of the subject wireless sensor network include, but are not limited to, enabling a person playing an electric guitar to adjust distortion or other effects by tilting the guitar instead of using foot pedals while playing, enabling a saxophone player to physically position the source of their sound anywhere in a concert hall by pointing their instrument in the direction they desire the music to be directed, and enabling a virtual instructor video game to inform a student that the student was holding an instrument incorrectly and too tightly during practice.

According to one embodiment, a wireless sensor network includes at least one sensor node having a sensor element and a transmitter element, and a receiver. Each sensor node of the at least one sensor node can have its own unique identifier. The identifier can be based on the type of sensor of the sensor node and instance. A plurality of sensor nodes, each node having a different type of sensor can be used. Multiple sensor nodes of the same sensor type may also be used. In addition, multiple sensor types may be provided for a single sensor node package, allowing different types of information to be transmitted based upon a same action sensing location.

In one implementation, a kit is provided. The kit can include a plurality of sensor nodes, a receiver, and a computer readable medium (or media) containing computer executable instructions for using data received by one or more of the plurality of sensor nodes in controlling additional functions. For an implementation of an add-on kit, the kit can omit the receiver and only include one or more sensor nodes. In certain embodiments, the computer readable medium (or media) can be omitted from the kit. In one such embodiment, the computer executable instructions can be accessed from a remote location (such as an application server) and downloaded to be executed on a device capable of executing the instructions and receiving the data from the receiver. In another such embodiment, the computer executable instructions can have at least a portion executed remotely from the device receiving the data from the receiver over a network (e.g., via cloud-based computing).

In a further embodiment, a user interface is provided for configuring and controlling the particular processing task that the data from the sensor nodes are to trigger and/or control.

It should be understood that while examples are provided herein of the subject wireless sensor network being applied to musical instruments, embodiments are not limited thereto and other forms of performing artistic expression that are not directly associated with musical instruments can be subjected to the subject wireless sensor network. For example, sensor nodes can be attached to a performer directly (where the performer may be a dancer, actor, or singer).

DETAILED DISCLOSURE

Figure 1A:
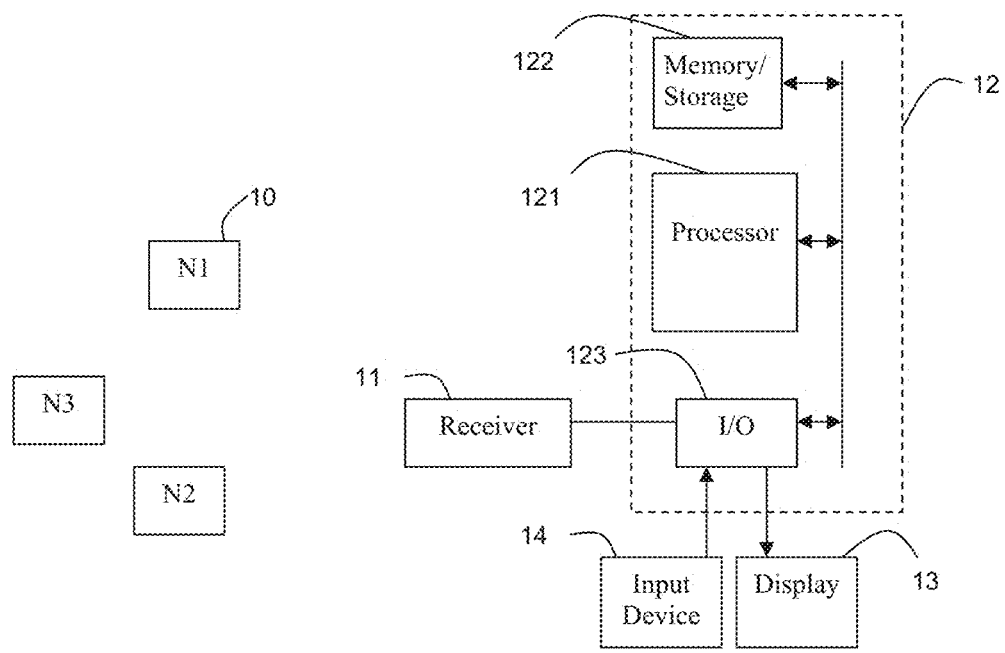
FIG. 1A shows a block diagram of a wireless sensor network for musical instruments in accordance with an embodiment of the invention.

Certain embodiments of the present invention are directed to expanding artistic expression. The expansion of artistic expression described herein is the ability to take traditional methods for artistic expression and use elements of that expression to control and affect a secondary aspect of a performance or design. The secondary aspect of the performance or design can be a part of the original expression or a separate type of expression. For example, elements of a musical expression can be used to control or affect aspects of that or another musical expression (e.g., a second instrument or another musical artist's expression) or even to control or affect aspects of a visual expression (e.g., a light show or video images).

The elements used to control and affect the secondary aspect of the performance or design can be a product of performing the original artistic expression. The product may be an intentional action on the part of the artist or an unintentional action that is a by-product of the artist's actions.

Certain embodiments of the invention augment the expressive capacities of the instrument and take full advantage of effort that is naturally exerted by the performer. A musical instrument may be viewed as an extension of the performer's physiology (breath, hands, arms, fingers, etc) to make sound. Sensing the physical gestures of the performer and broadcasting this data to computers for processing enables new indicative relationships between a performer, instrument, and acousmatic sound.

In order to affect the aspects of the performance, a wireless sensor network and corresponding data processing/controlling effects and user interface modules are provided. The subject networks allow a musician to interact with components and controllers including, but not limited to, VST effects processing, algorithmic computer music processes, and stage lighting. In addition, certain embodiments of the subject wireless sensor network enable real musical instruments to become video game controllers or interactive devices. Temperature, pressure, ambient light, motion, and sound can be used to control supporting and/or augmenting performance tools.

A "supporting" performance tool refers to a periphery not directly related to the musical instrument itself including, but not limited to, stage lighting or set automation. An "augmenting" performance tool refers to a tool that pertains directly to the musical instrument itself including, but not limited to, audio signal processing.

As one example of an application of the subject wireless sensor network, a person playing the clarinet (an omni-directional instrument) can cause the sound of the clarinet to be physically localized to a specific area in a concert hall based on the directional orientation of the instrument mapped to an array of loudspeakers.

As another example of an application of the subject wireless sensor network, a person can control the amount of distortion effect on an electric guitar by simply tilting the guitar instead of pressing a foot pedal.

Embodiments of the subject invention are directed to a wireless sensor network for musical instruments that will allow a musician to communicate natural performance gestures (orientation, pressure, tilt, etc) to a computer. User interfaces and computing modules are also provided that enable a user to utilize the data communicated by the wireless sensor network to support and control the artistic expression.

Embodiments may also include computer-readable media having computer-executable instructions or data structures stored thereon. It should be appreciated by those skilled in the art that computer-readable media include removable and non-removable structures/devices that can be used for storage of information, such as computer-readable instructions, data structures, program modules, and other data used by a computing system/environment. A computing system can be a general computer, specific computer, a distributed computer, or other processing device. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data. Computer-readable media should not be construed or interpreted to include any propagating signals.

Computer-executable instructions comprise, for example, instructions and data which cause a general purpose computer, special purpose computer, or special purpose processing device to perform a certain function or group of functions. Although the subject matter is described herein in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Embodiments of the subject wireless sensor network provide a modular, non-destructive, non-invasive, and reconfigurable approach enabling a musician or performer to interact with computers in live performance using the physical gestures of their instrument. In combination with the subject user interfaces and computing modules, the performer, improviser, and composer have basic building blocks to easily combine or reconfigure unique sensor groupings to control effects processing, algorithmic and generative computer music, and virtual sonic environments. The user is not required to understand microprocessors, circuit design, or programming.

FIG. 1A illustrates a block diagram of a wireless sensor network in accordance with an embodiment of the invention. Referring to FIG. 1A, the wireless sensor network includes at least one sensor node 10 and a receiver 11. Data is transmitted by the at least one sensor node 10 and received by the receiver 11 over a network. According to one embodiment, the receiver 11 can be part of a data hub that manages handshaking and dynamic reconfiguring of the sensor network. In a specific embodiment, the data hub (receiver 11) can include an RF antenna, an asynchronous receiver/transmitter (UART), and a USB or other interface for connecting to a computer 12.

In a preferred embodiment, the receiver and node operate as a wireless sensor radio network. However, embodiments are not limited thereto. In addition, the receiver can communicate with the computer 12 over a network (and/or the computer 12 may communicate with another computer or server over a network. The network over which the receiver 11 and the computer 12 communicate (as well as the network over which the computer 12 and another computer communicate, which may be a same or different type as the network over which the receiver 11 and the computer 12 communicate) can be any suitable communications network including, but not limited to, a cellular (e.g., wireless phone) network, the Internet, a local area network (LAN), a wide area network (WAN), a wireless personal area network (WPAN), a WiFi network, or a combination thereof. As will be appreciated by those skilled in the art, sensor networks and communication networks can take several different forms and can use several different communication protocols.

Although three sensor nodes N1, N2, and N3 are illustrated in the drawing, embodiments are not limited thereto. To use the data received from the at least one sensor node, the receiver is connected to a computer 12. The computer may be a general purpose computer, special purpose computer, or special purpose processing device. The computer 12 can include a processor 121, a memory and/or storage device 122, and an input/output (I/O) module 123 to which a display 13 and an input device 14 can be connected. The input device 14 can be any suitable human interface device (HID). A HID includes, but is not limited to, a mouse, keyboard, joystick, touchpad, simulator, remote, glove, and webcam. The receiver 11 can be connected to the computer via the I/O module 123. For wireless communication with the receiver 11 (or another computer or server), the I/O module 123 can include a network card or other communication enabling device The computer can use the data obtained by the receiver when performing various processes.

Each sensor node of the at least one sensor node 10 in communication with the receiver 11 can have its own unique identifier. The identifier can be assigned at factory or be provided on-the-fly during a set up stage between a sensor node and the receiver to which the sensor node will be communicating with. The identifier can be based on the type of sensor of the sensor node and instance. The identifier may be, in part, randomly generated. It should be understood that the randomly generated identifier can be generated according to a true random or pseudorandom number generator.

When the receiver 11 functions as part of a data hub, the data hub can determine, from the data transmitted by each sensor node, the type of sensor of the sensor node and the instance of that sensor. To enable such determinations, in certain embodiments, each sensor node broadcasts its identifier in the transmitted signal (for example, via most significant or least significant bits). The identifier can include one or more bits directed to the sensor type and one or more bits directed to the instance (actual instance number for the particular sensor type or unique serial number indicating a particular manufactured sensor node).

In one embodiment, each sensor node can have a different type of sensor. In another embodiment, more than one sensor node being used for a particular performance can include a same sensor type.

In certain embodiments each sensor node is removably attached to a person or instrument. The sensor nodes can be attached at same or different locations about the person or instrument depending on the particular application. The sensor nodes can be placed as needed onto various locations of a person or instrument as desired by the user. For example, multiple nodes, each having a bend sensor, can be placed on each knee and elbow for motion capture. In one embodiment, a plurality of sensor nodes can be provided in a single package that can be affixed to one location on the instrument or person. In addition, multiple sensor types may be provided for a single sensor node package, allowing different types of information to be transmitted based upon a same action sensing location.

One of the issues plaguing musical instrument augmentation is the network of wire often required. Instead of connecting all sensors on an instrument by wire to a single large wireless transmitter, the subject sensor nodes each wirelessly transmits its own data; localizing only short wires to the specific position on the instrument or eliminating wires entirely. Further, the subject sensor nodes can be designed to be of a small size, minimizing weight and clutter on the instrument.

Figure 1B:
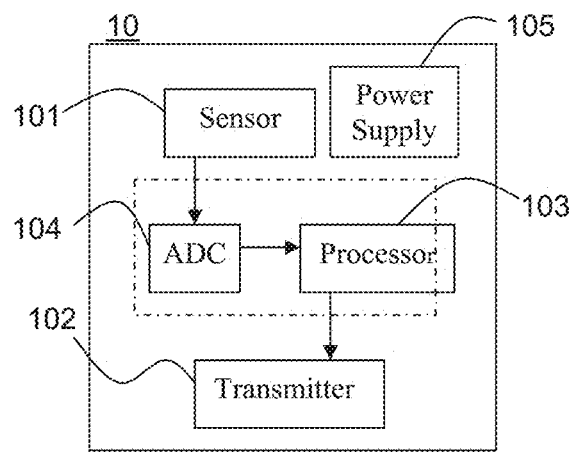
FIG. 1B shows a block diagram of a sensor node in accordance with an embodiment of the invention.

FIG. 1B illustrates a block diagram of a sensor node 10 in accordance with an embodiment of the invention. A sensor node 10 can include a sensor 101 and a transmitter 102. The sensor 101 can be, but is not limited to, an accelerometer, a force sensing resistor (FSR), sonar, an infrared (IR) sensor, a photosensor, an inertial measurement unit (IMU) sensor, an Attitude/Heading Reference System (AHRS) sensor, a temperature sensor, or a general purpose motion or orientation sensor. An I2C communication interface (not shown) may be included. In one embodiment, the sensor 101 can be a sound (volume, power, or frequency) measurement device.

A processor 103 can be included to control the transmission of data from the sensor node to the receiver. An analog to digital converter (ADC) 104 is included for sensor nodes having a sensor that outputs an analog signal. The ADC 104 may be a separate component from the processor or a part of the processor 103 (see dotted line).

The processor 103 can be used to control the clock and/or frequency of broadcasting for transmitting the signal from the sensor 101. In one embodiment, the processor determines whether the sensor value has changed before updating the transmitted value. This can inhibit the sensor from tying up the network with an output indicating no change sensed by the sensor.

A power supply 105 is included with the sensor node and can provide power to any components of the sensor node that require a power source. The power supply can include a battery or other power storage device. In one embodiment, the power supply can be an embedded power harvesting receiver receiving power wirelessly. In other embodiments, energy scavenging/harvesting circuits and/or chips can be included at the sensor node.

In one implementation, each sensor node can further include a switch and at least one LED. For example, the switch can be used to turn on the sensor node when in use. Once the sensor node is turned on, the transmitter may continuously transmit data from the sensor node. The data rate of the data transmission depends on the particular sensor being used (certain sensors may update at particular frequencies). In one implementation, the at least one LED can include a red LED and a green LED. The red LED can be configured, for example, to blink if the sensor node is out of range of a receiver or does not get an indication that the receiver is on. The green LED can be configured, for example, to turn on when the sensor node is in range of a receiver and working properly.

The sensor nodes can be treated by a musician/user analogously to a piece of hardware that musicians are generally familiar with: the mute. For brass and string instruments, mutes are placed inside of the bell or on the bridge to alter the sound with interesting effect. These are readily available for musicians to acquire. The sensor nodes may be regarded as an extension of this tradition, where a musician can easily acquire and place these objects on an instrument to extend its sonic and expressive capacities with the aid of the computer and microphone. With these nodes, the composers/performers can intuitively construct and reconfigure their own customized wireless physical interfaces between instruments and computers. The possibilities and interactive paradigms may reach a new level of flexibility, expression and accessibility.

Embodiments of the invention provide a modular system that can be interchanged as needed. In a specific embodiment, the modular system includes individual sensor nodes (a transmitter/sensor pair) and a single universal receiver (e.g., data hub) that collects the sensor transmissions and sends compiled packets to the computer via USB (or other communication interface). Each node has its own unique ID (for example, based on its sensor type and instance). The node is dedicated to transmit only the data of its attached sensor. For example, one node may be dedicated to transmitting sonar data and another node may be dedicated to measuring ambient light. The user is then free to utilize one, both, or neither of these sensor nodes by turning them on or off—attaching or detaching. Multiple sensor nodes of the same sensor type may also be used. In this manner, one can acquire a collection of general sensor nodes and use a subset of them in any combination as needed for a particular application.

In accordance with an embodiment of the invention, a discovery mode is provided in which the universal receiver (also referred to as a "data hub" or "receiver hub") performs a handshaking method with sensor nodes to "discover" the sensor nodes within its network and ensure that the sensor nodes and receiver are operating on a same channel. For example, the sensor nodes can be pre-programmed for broadcasting on a factory default channel while the receiver is programmed to receive on a unique channel (may be random). Each sensor node can include a button that a user can depress to trigger the discovery mode. In the discovery mode, the node performs a channel sweep until it finds the receiver's unique channel and saves this channel frequency in memory. Once discovery mode is performed, the node is configured to communicate with a receiver receiving at the unique channel. Multiple receivers can be used in a same area by providing each receiver with its own unique channel to which corresponding sensor nodes are configured to communicate. This allows multiple receivers to be in use in the same location with minimal cross-talk between nodes of one person's system with those of another person's.

In one embodiment, nodes only communicate to the one receiver they synchronized with. Data can still be passed to other computers and even other hardware/software from the computer to which the receiver is connected.

In order to avoid mechanical and other non-reversible alterations to the musical instruments being used with the subject wireless sensor network, the sensor nodes are detachable and removably fixable from the instrument. For example, a "hook-loop" fastener can be used to enable the user to easily revert back to their original acoustic instrument when desired. In other embodiments, non-damaging, removable adhesives can be used.

Embodiments of the subject system are reconfigurable. The nature of this interface design allows the user to easily reconfigure the placement and combination of individual sensor nodes for any given project and instrument. This enables the user to find the most optimized network combination, sensor-instrument placement, and mapping to meet their unique aesthetic goals without having to redesign the technology itself. The sensor nodes may even be distributed amongst several instruments or non-instrument performers, such as dancers to create novel modes of musical interactivity. For instance, a dancer may control the spectral filtering of a flute player through their body movements.

Figure 2:
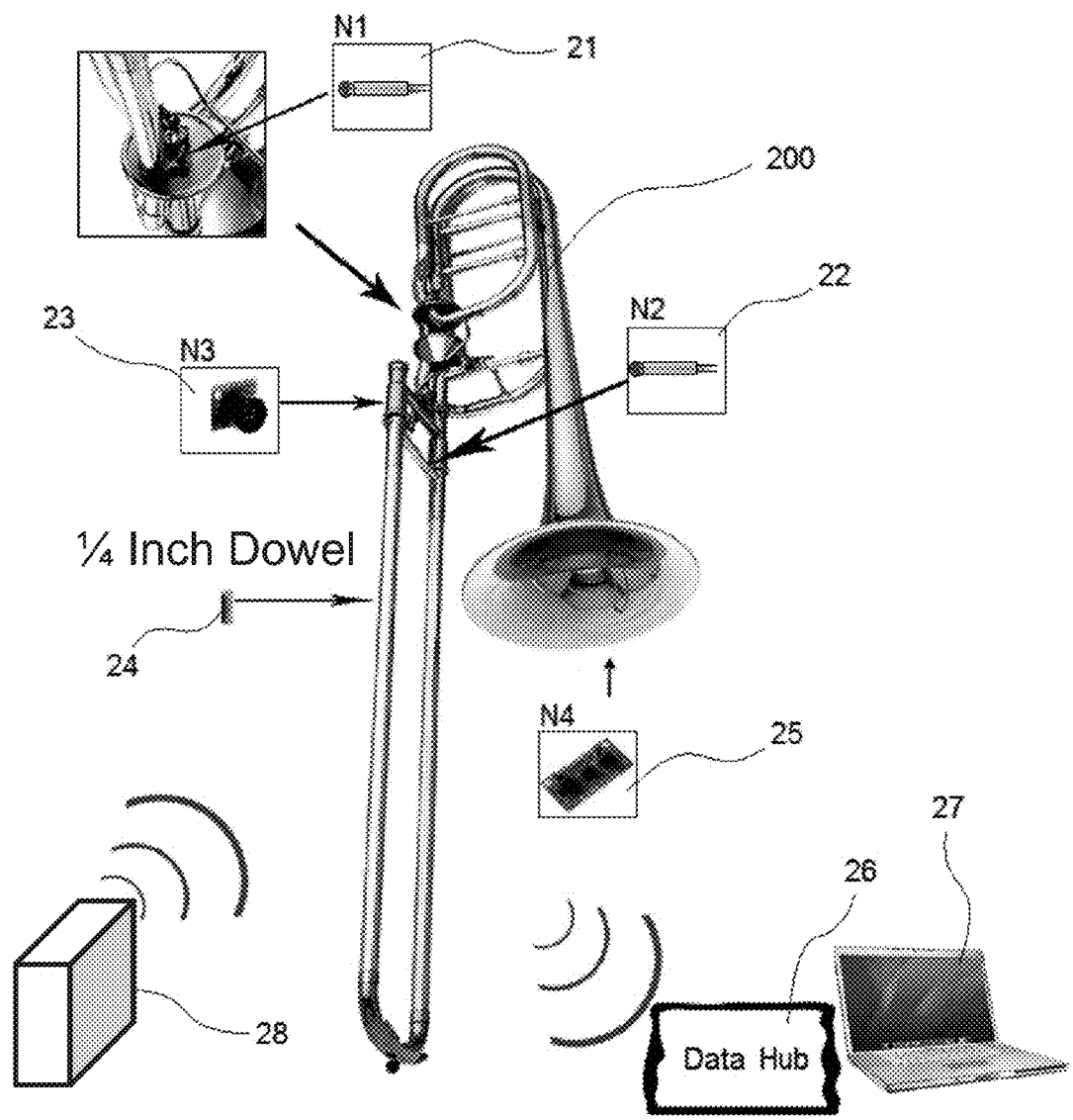
FIG. 2 shows a representation of a wireless sensor network for musical instruments in accordance with an embodiment of the invention.

FIG. 2 illustrates a specific embodiment of the subject wireless sensor network for musical instruments. Referring to FIG. 2, sensor nodes are removably fixed to a trombone 200. As an example, a first sensor node 21 including a hall effect or force sensitive resistor is placed on the valve shifting mechanism of the trombone or at a position where the left hand would make contact when a musician is playing the instrument (e.g., on or near the slide receiver). A second sensor node 22 including a force sensitive resistor is placed at a position where the right hand would make contact when a musician is playing the instrument (e.g., on or near the main slide hand grip).

A third sensor node 23 including sonar is placed on a fixed part of the main slide to measure the distance the main slide moves. For example, the third sensor node 23 including the sonar can be placed on or near the mouthpiece receiver. A light-weight dowel 24 can be employed to provide a detectable object for the sonar of the third sensor node to continuously detect. In one embodiment, the dowel 24 is attached onto the mobile part of the slide a particular distance from the mounted position of the third sensor node 23. The particular distance spacing depends on the minimum detectable distance of the sonar.

A fourth sensor node 25 including an IMU is placed on or near the bell. The IMU can be, for example, a 6-DOF IMU (3-axis accelerometer and 3-axis gyroscope) attached to the instrument to measure overall instrument orientation and tilt. In a further embodiment, a 3-axis magnetometer is included in the IMU to provide an AHRS at the fourth sensor node 25.

In the example implementation, each sensor node unit (N1, N2, N3, N4) includes a non-destructive mounting apparatus, an on/off switch, and status LEDs. A single data hub 26 can be used to receive the data transmitted by the sensor nodes and transfer data to a computer 27.

According to one embodiment, the data hub 26 manages handshaking and dynamic reconfiguring of the sensor network. The data hub can include an RF antenna, an asynchronous receiver/transmitter (UART), and a USB or other interface for connecting to a computer. The data hub can determine, from the data transmitted by each sensor node, the type of sensor of the sensor node and the instance of that sensor. To enable such determinations, each sensor node broadcasts an identifier in the transmitted signal (for example, via most significant or least significant bits). The identifier can include one or more bits directed to the sensor type and one or more bits directed to the instance (actual instance number for the particular sensor type or unique serial number indicating a particular manufactured sensor node).

A wireless power source 28, such as a RF-based power source, can be included for implementations of the sensor nodes configured to receive power wirelessly. For wireless power implementations, a power receiver is included in the sensor node.

In accordance with certain embodiments of the invention, a processing system and user interface is provided. The processing system and user interface can be similar to a digital audio workstation (DAW), but instead of audio signals, the subject processing system utilizes the incoming data from the sensor nodes of the wireless sensor network. Examples of DAWs used in audio production include Apple LOGIC PRO, Avid PRO TOOLS, Cakewalk SONAR, and Steinberg CUBASE. Accordingly, for certain embodiments of the invention a similar multi-track tape recorder-based interface can be used in order to further facilitate a musician's interaction with the subject wireless sensor network and processing system. Using this model, in one embodiment of the invention, a user interface for a computer-based digital data workstation is provided having a layout similar to the DAW layout of transport controls (e.g. play, pause, and rewind), track controls and/or a mixer, and a waveform display. Single track or multi-track displays can be provided in various embodiments. In addition, the user can save processing and mapping settings for a given session. The processing and mapping settings can be saved to a file for later access. The processing and mapping settings can be saved as a session or to specified presets within a session. This allows the user to not only explore the most optimal processing and mapping of their network, but save settings for later access as well. The user can change presets (and thus the behavior of the sensor network) in mid-performance. For example, during a performance, the presets can be activated to progress from one processing and mapping configuration to a different configuration that was saved from a past rehearsal session.

During operation of the wireless sensor network, when the data hub determines that a new instance of a sensor node is online, a user interface module can be provided to access the new instance of the sensor node. In one implementation, a user interface screen may become available on a user's computer display. The user interface can include a first screen with a waveform display and buttons instantiating a process and/or providing access to second screens with additional features/functions. Of course, in certain embodiments, the user interface can be provided in more of a DAW layout as described above. In addition, a user can change (e.g., reassign) the particular instance number of a sensor node within the DAW-based interface.

Figure 3:
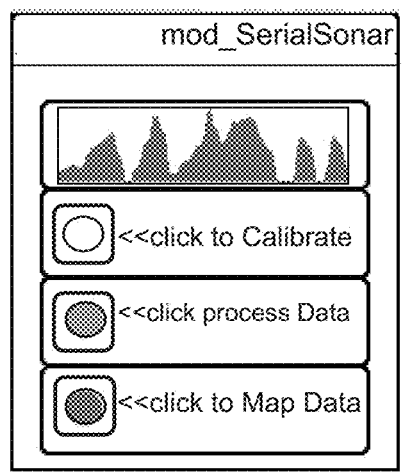
FIG. 3 shows a diagram of a user interface module of an active sensor node on a wireless sensor network in accordance with an embodiment of the invention.

FIG. 3 shows a diagram of a simple user interface module of an active sensor node on a wireless sensor network in accordance with an embodiment of the invention. Referring to FIG. 3, a simple user interface module for a sensor node with sonar can include a waveform display of the data received from the sensor node with sonar and three selections. From the first screen, a user can initiate a calibration and enable processing and mapping of the data.

In one embodiment, a user can click on the calibration button to initiate a calibration. The calibration can be carried out to address the use of the sensor node in a particular environment or address issues with changing or decreased power supply to the sensor node, which may cause incoming values to fluctuate. For example, the environment, position, and application of the sensor may change. The calibration enables normalization of the data range to an expected range for further processing.

Figure 4A:
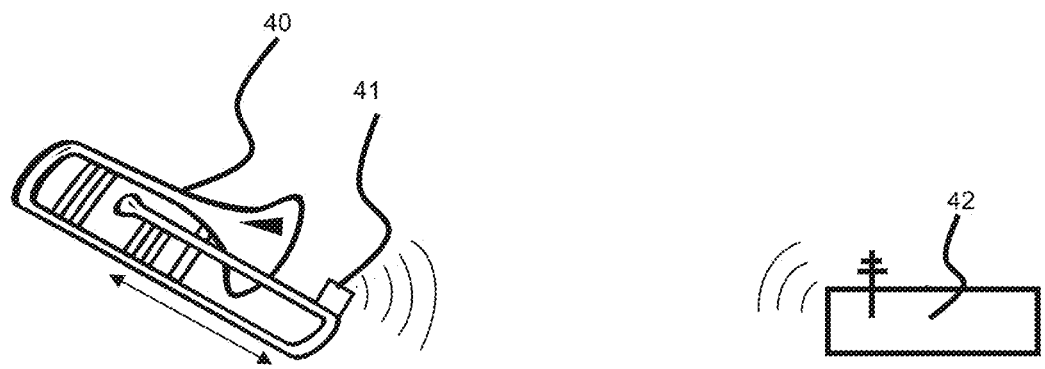
FIG. 4A shows a representation of a calibration step in accordance with an embodiment of the invention.
Figure 4B:
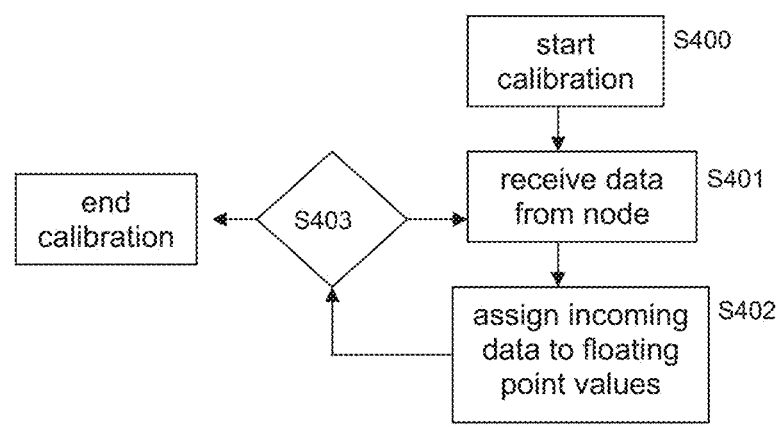
FIG. 4B shows a flow chart illustrating a method for calibrating data received by an active sensor node on a wireless sensor network in accordance with an embodiment of the invention.

FIGS. 4A and 4B illustrate a calibration process in accordance with an embodiment of the invention. Referring to FIG. 4A, a trombone 40 having a sensor node 41 transmitting sonar data of the sliding movement of the trombone to a data hub receiver 42 can be calibrated to assign minimum (min) and maximum (max) values for the distance of the sliding movement. According to one embodiment, as shown in FIG. 4B, the clicking of the calibrate button starts the calibration S400. This step clears min and max values assigned to the incoming data. Data is received from the node S401 and the incoming data is assigned to floating point values S402. In one embodiment, the incoming raw data is mapped to floating point values between 0 and 255. Of course, the values can be any range of values such as from 0-100. The receiving of data and assigning floating point value is carried out repeatedly for a predetermined period of time or until a user clicks a button on the screen to stop the calibration S403. As each data value is received, it can be compared to an existing value stored as min or max. For example, if the received data value is smaller than that stored as min, then the received data value replaces the existing min value. The calibration process scales the data to a predictable range of floating point values based on the movable min and max parameters.

In another embodiment, the calibration is continuous and occurs as long as the data hub is receiving data from a sensor node. In such an embodiment, the calibrate button can be omitted.

Figure 5:
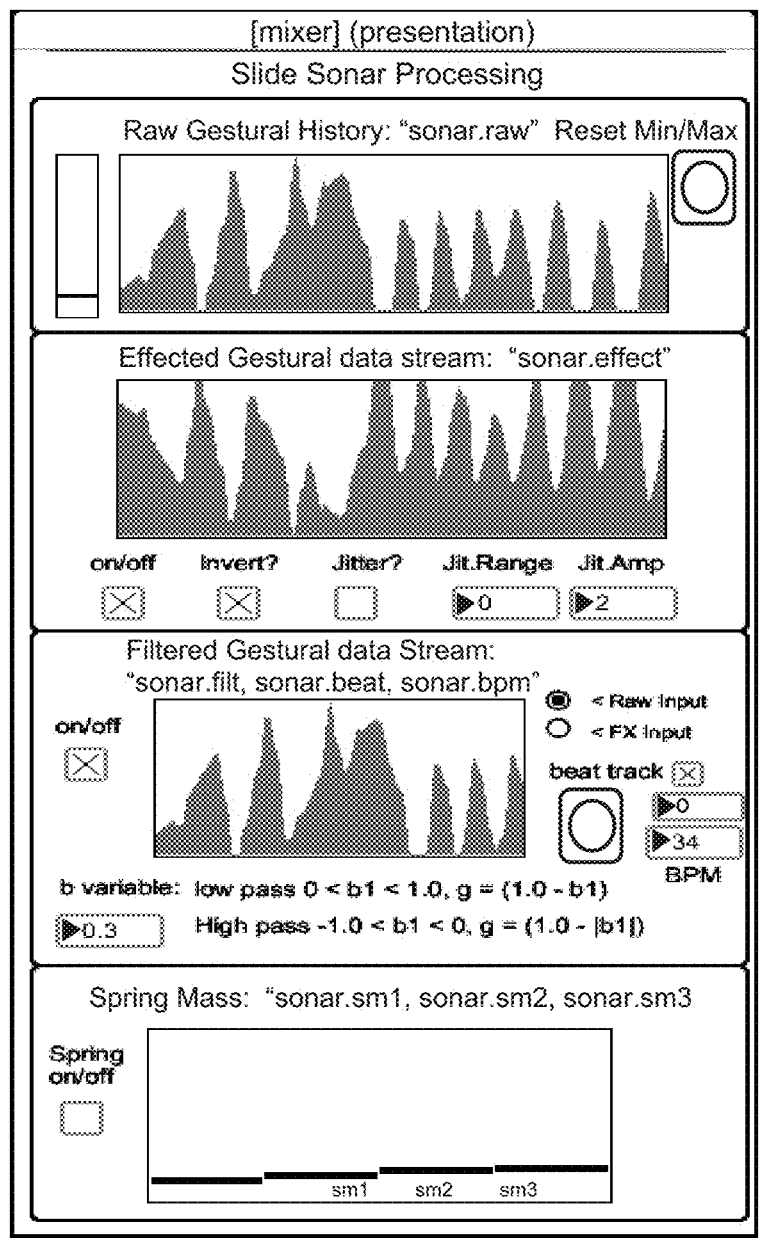
FIG. 5 shows a diagram of a user interface module for processing data for an active sensor node on a wireless sensor network in accordance with an embodiment of the invention.

FIG. 5 illustrates an example user interface of a second screen accessed upon clicking the button in FIG. 3 to process data. Referring to FIG. 5, the data from the sensor node can be processed and modified before being used to control a particular function. According to the specific implementation shown in FIG. 5, the data mixer window of the subject digital data workstation includes a window illustrating the raw data (labeled sonar.raw for the sonar data) and subsequent windows illustrating a variety of available effects. For example, a first processing effects window can be provided to turn on/off inversion and jitter effects (the inverted and/or jitter effected signal being labeled sonar.effect). A second processing effects window can be provided to turn on/off filters and beat tracking effects. The raw data or patched data having one or more processing effects (described in more detail with respect to FIG. 6) may be processed using the second processing effects window. The filters include low pass and high pass filters (filtered data labeled sonar.filt). Although not shown, band pass filters can also be implemented. The beat tracking effects can include a determination of the beat of the data—i.e., the rise and fall events based on a threshold to map times between the events (the beat track data labeled sonar.beat). A BPM (beat per minute) value can be adjusted to modify the frequency of the rise and fall events (the BPM adjusted data labeled sonar.bpm). Physical models can also be included in the data processing. For example, a third window can be provided for a physical model such as a spring mass model (in the example three springs are shown and the corresponding data is labeled sonar.sm1, sonar.sm2, and sonar.sm3).

In accordance with certain embodiments of the invention, each process is separately viewable and assigned its own track. This enables the same raw data to be used simultaneously in multiple forms, which will be explained in more detail with respect to FIG. 6.

It should be understood that the screen illustrated in FIG. 5 is merely an example of one embodiment and should not be construed as limiting. For example, a DAW-type interface can be provided, such as shown in FIG. 10, where each node data can be processed on individual tracks and a data mixer provides filtering and other effects and processes.

Figure 10:
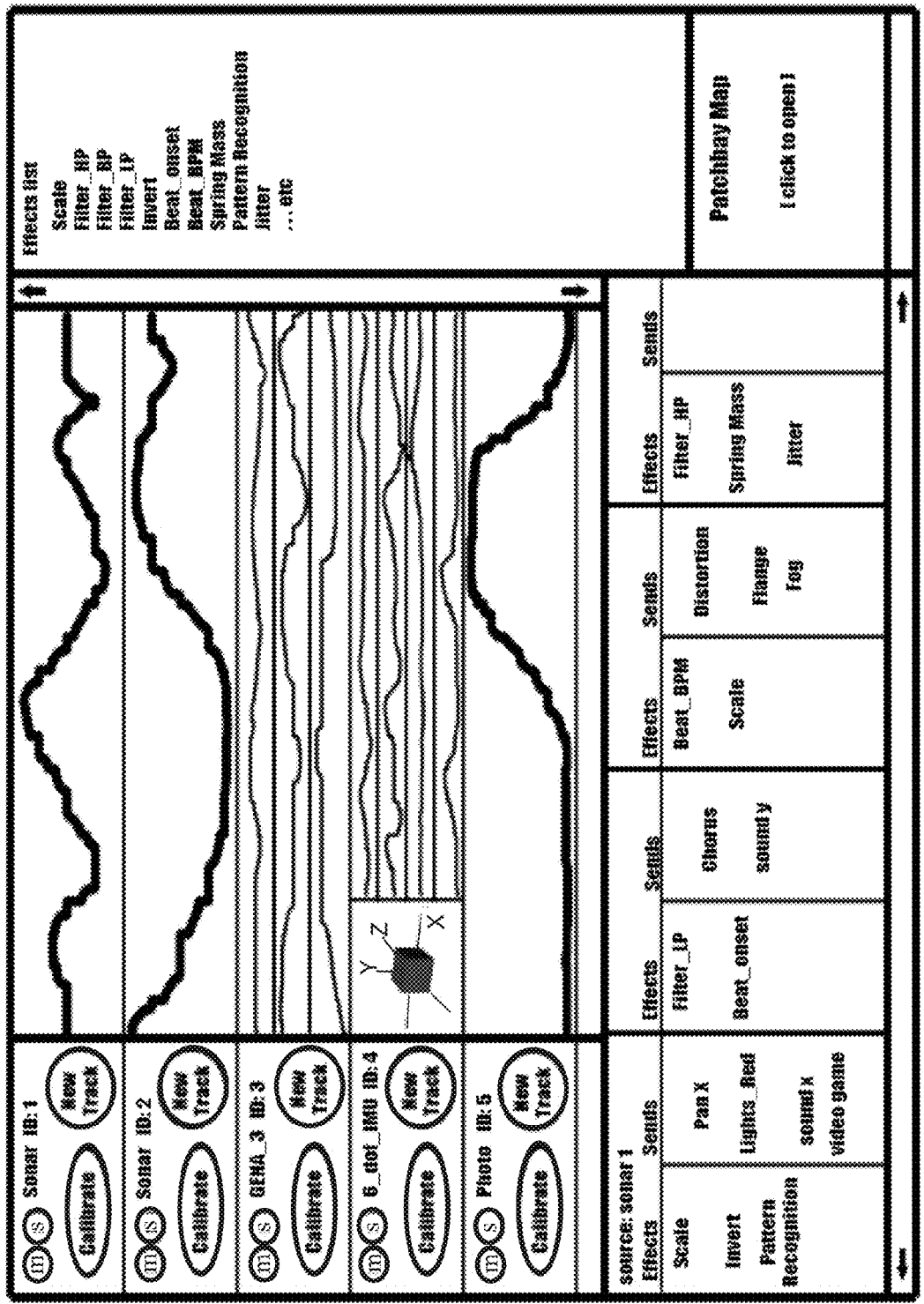
FIG. 10 shows a DAW-based user interface in accordance with an embodiment of the invention.

FIG. 10 illustrates an example of DAW-based interface. Referring to FIG. 10, a digital data workstation can include a column for the data tracks that are on the network. Calibration, assignment of an ID, mute/solo functions, and creation of a new track can be accomplished in this column. Live data value streams from the sensors can be provided in a column next to the column for the data tracks on the network. For sensor types with different number of outputs, the digital data workstation can provide a live data value stream for the appropriate number of outputs. For example, a sonar sensor has one output data stream, while a 6-dof sensor provides six output data streams. A listing of available processes is also included on the screen. Selecting "new track" in the interface can create a new stream to perform the processing and mapping on. Effects can be assigned in the effect column and output can be assigned in the send column and selecting "patchbay map" can bring up a global map user interface (UI) (functions described in more detail below with respect to FIG. 6).

In yet another embodiment, data received from the sensor nodes can be read and entered into an existing DAW for processing. In such an embodiment, an interface is provided to the existing DAWs to enable the data to be processed by the DAW. In contrast to data typically used by existing DAWs, the data received from the sensor nodes does not represent an audio signal (unless a particular node is transmitting an audio signal). Rather, the data represents digital values of an analog or digital sensor output.

Figure 6:
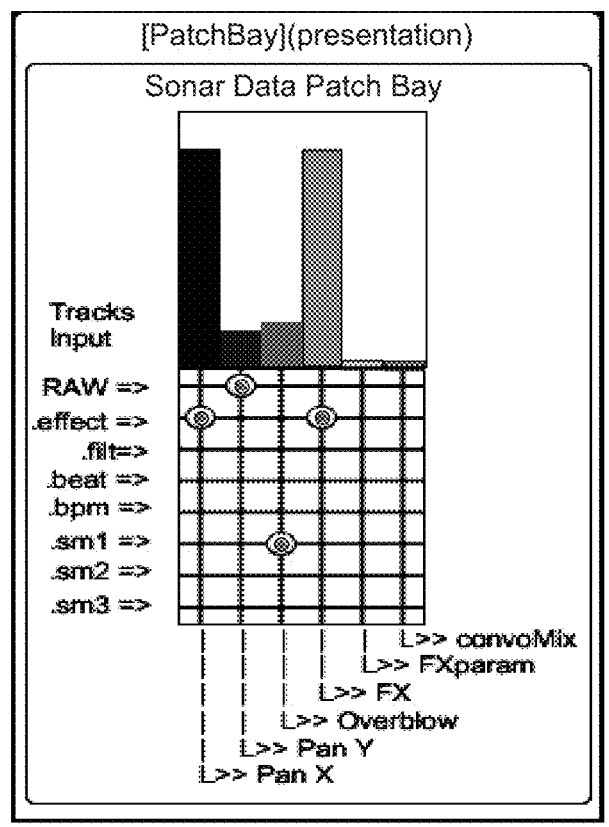
FIG. 6 shows a diagram of a user interface module for patching data for an active sensor node on a wireless sensor network in accordance with an embodiment of the invention.

Referring again to FIG. 3, the data from each sensor node can be mapped to control audio and/or visual (or other) effects. In one embodiment, a user can open a patch bay screen such as shown in FIG. 6 upon clicking the button to map data. When the data has been processed, each track of processed data can be used to control a particular aspect of the performance. The patch bay screen enables a user to "patch" a data track to a particular aspect of the performance.

One data stream may control multiple parameters. In addition, multiple streams may be used to affect a single parameter, thus creating a real time method for the user to experiment with the most optimal and intuitive mapping scheme for a project. In accordance with certain embodiments of the invention, the mapping provides a user configurable method of connecting and disconnecting (i.e. patching) data streams and outputs, in a one-to-one, one-to-many, many-to-one, or many-to-many setup.

For example, as shown in FIG. 6, the available data tracks from the example sonar data include the raw data (sonar.raw) and the processed data tracks of sonar.effect, sonar.filt, sonar.beat, sonar.bpm, sonar.sm1, sonar.sm2, and sonar.sm3 as described with respect to FIG. 5. In this example, the particular aspects of the performance being controlled by the data include Pan X, Pan Y, FXOverblow, FXparam, and convoMix. Pan X and Pan Y control panning of a speaker output, and the FX and convoMix outputs are directed to available audio processes. Available audio processes can also include VST instruments and effects. The processed data tracks can also be patched back to be further processed. A visual characterization of the data value of the data stream at a time x for the corresponding data track is shown above the patch location of where the data is going to. For example, the sonar.effect data is being patched to the Pan X while the sonar.raw data is being patched to the Pan Y. As shown in FIG. 5, the sonar.effect data is the inversion of the sonar.raw data. Therefore, the visual characterization above Pan X is the inverted value of the sonar.raw data above Pan Y.

While FIG. 6 illustrates one form of a UI for a patchbay, embodiments are not limited thereto. For example, icons and arrangements can be provided to represent the mapping of a data stream to an output. As one example embodiment, data streams and particular outputs can be represented by "floating" icons in a window by which a user can drag (with a mouse, finger, or any suitable human interaction device) the data stream icons and the particular outputs icons in proximity of each other. When an output icon and a data stream icon are placed in proximity, a connection can be made. Similarly, the two icons can be dragged apart, terminating the connection.

Figure 7:
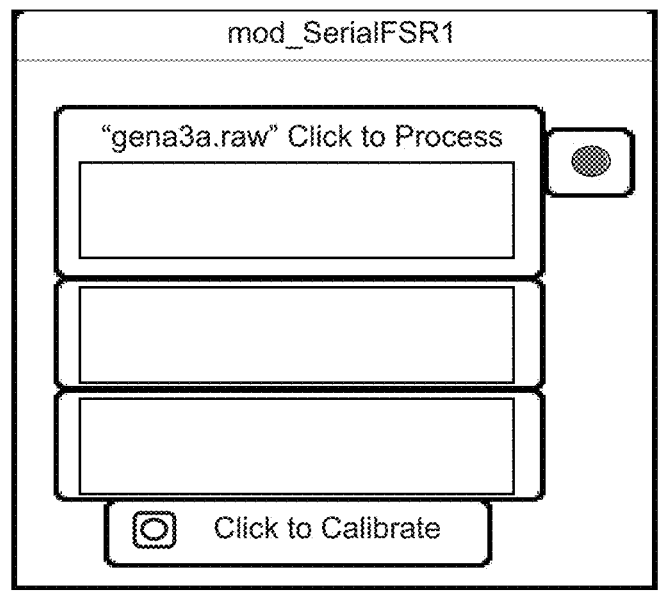
FIG. 7 shows a diagram of a user interface module of a general analog device in accordance with an embodiment of the invention.
Figure 8:
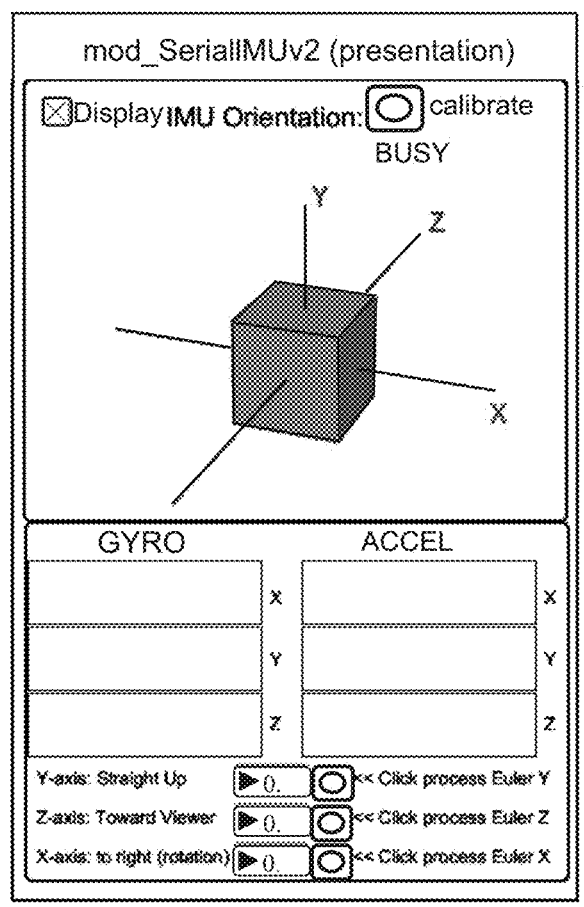
FIG. 8 shows a diagram of a user interface module of a six degree of freedom (6-dof) IMU module in accordance with an embodiment of the invention.

FIG. 7 illustrates a user interface for a general analog device that transmits three data packets (providing three raw data streams) in accordance with an embodiment of the invention. One type of sensor node that may instantiate this interface upon detection by the data hub is a sensor node with a force sensitive resistor. The general 3-input analog device interface includes three raw data display streams and a calibration button. FIG. 8 illustrates a user interface for a sensor node with an IMU in accordance with an embodiment of the invention. Although not shown, a mapping button can also be included for the initial screen for both the general analog device and the IMU user interfaces.

Figure 9:
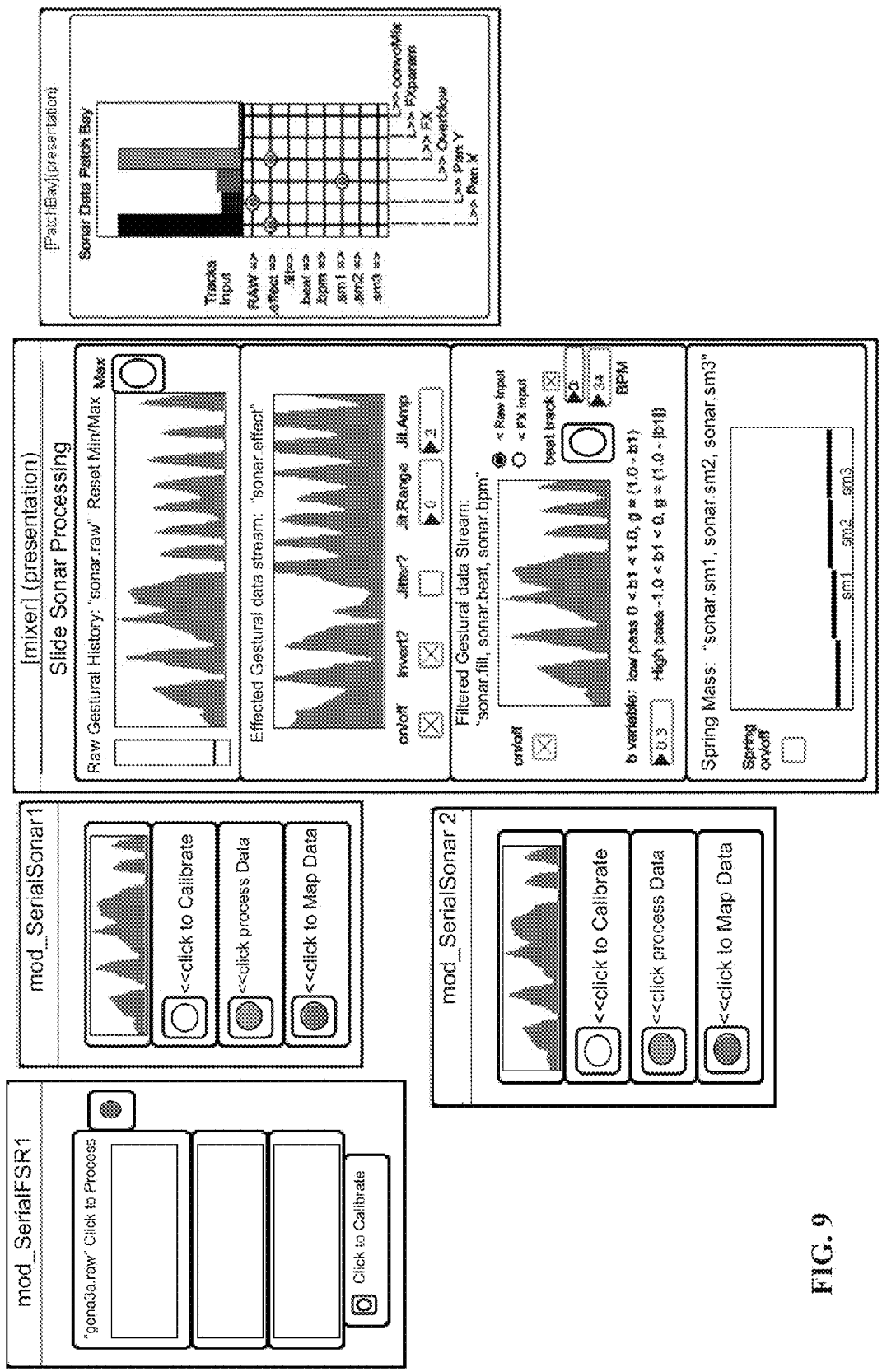
FIG. 9 shows a diagram of a screen providing user interface modules of active sensors on a wireless sensor network in accordance with an embodiment of the invention.

FIG. 9 shows a diagram of a screen providing user interface modules of active sensors on a wireless sensor network in accordance with an embodiment of the invention. For the example shown in FIG. 9, two instances of a sensor node including sonar and one instance of a general 3 output analog device is detected on the network. Each window corresponds to a module dedicated to executing its own particular task. A serial input module (not shown with a window) can read in all incoming serial data to the computer (or other processing/controller device) received wirelessly by the data hub. The incoming serial data is input into a global buffer that can be accessed by the other modules. Each sensor node in the system outputs its own stream of data and a unique ID number. The data hub determines the particular sensor node to which the incoming data stream belongs and assigns the data stream to a channel that can then be processed by the user. This assigned channel is reflected by the first windows that are instantiated for each sensor node (labeled mod_SerialSonar and mod_SerialFSR1). Clicking on the process data button on the first window module for a particular sensor node, such as one of the mod_SerialSonar instances, opens the data mixer window (labeled [mixer] (presentation)). All of the processed outputs are globally accessible and can be patched in a variety of ways. For example, a matrix map of available data streams and of existing musical parameters the data can affect pops up when the map data button is clicked on a first window module. As shown in FIG. 9, multiple modules can run simultaneously. In addition, the module data streams can be output into other music or non-music programs using an additional process in the chain. In certain embodiments, the data can be converted to a standard data protocol including MIDI, Open Sound Control or Touch OSC, or UDP before being transmitted to a connected MIDI hardware device or Apple IPHONE or IPAD, or over a network to a remote computer or other device.

Figure 11:
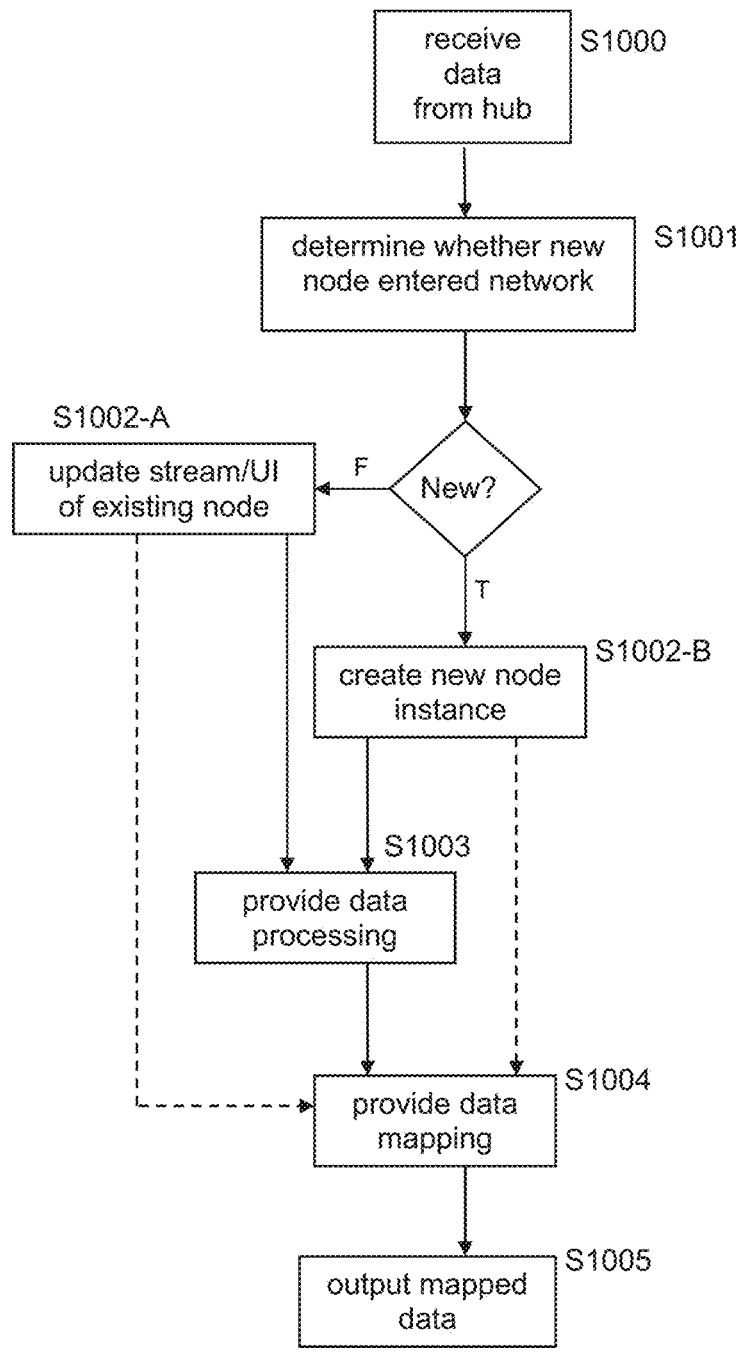
FIG. 11 illustrates a flowchart of a processing module for the wireless sensor network in accordance with an embodiment of the invention.

FIG. 11 illustrates a flowchart of a processing module for the wireless sensor network in accordance with an embodiment of the invention. Active sensor nodes transmit sensor data at a rate and packet length determined by sensor type. The message sent from each active sensor node includes information related to sensor type (device_ID), a unique identifier (instance_ID), and the actual sensor data (Data). The device_ID can be preprogrammed into each node to provide an indication of the sensor type for the node (as well as what kind of data to expect). The instance_ID can be randomly generated in factory programming and saved into memory. The value (number) of the instance_ID indicates the particular instance (or identity) of a particular sensor, which is beneficial when multiple nodes having a same type of sensor are used). For the case where two nodes have the same instance_ID, a different identifier can be generated on-the-spot. For example, in an embodiment utilizing the discovery mode between node and receiver, the discovery mode button on the node can be depressed for a prolonged period of time to cause the node to generate a different instance_ID and save the different instance_ID into memory.

A data hub (or receiver) of the network can be connected to a computer via a USB port (or other wired or wireless communication interface). The data hub can remain in standby until data is received on the network. The data hub parses the data received over the network based on sensor type (determined by device_ID) and echoes the data to the computer. This data is received by the computer and becomes available for the subject processing system.

Referring to FIG. 11, a processing module in accordance with an embodiment of the invention receives the data echoed from the data hub S1000 and determines whether the incoming data is from a new or existing node on the network S1001. To determine whether the incoming data is from a new or existing node on the network, the instance_ID of the incoming message can be compared to the instance_ID of existing nodes. If the instance_ID is not new, the data stream and UI display of the raw data is updated for an existing track (and available for further processing or use) S1002-A. If the instance_ID is new, a new Data Track (or UI instance) is created S1002-B. The sensor type listed can be assigned a default instance number based on the order of appearance on the network or the instance_ID can be carried over. In certain embodiments, the user is free to manually change the instance number.

For each track or UI instance, data processing is provided S1003. In addition, data mapping is provided S1004. The processed data and the raw data updated as received from the hub are made available as data streams to be mapped to available outputs. The mapped data is transmitted to the assigned outputs S1005. The steps S1001-S1005 can be performed continuously so long as data is being received from the hub S1000. The continuous availability of the mapping allows for the exploration of an optimal sensor configuration and mapping by the composer and/or performer for any given application in real-time. In addition, although not shown in FIG. 11, in certain embodiments, upon shut-down of sensor node or upon traveling out of range of the receiver hub, the data track may either be removed or placed on standby—waiting for the sensor to be turned on again or come within range.

The processing module can also stop performing one or more of the steps by manually manipulating one or more of the processes (for example, upon receiving an input from a user to shut down or close a particular process).

By providing data processing, a user may modify the raw data before using the data to control program or device at the output. The processes include, but are not limited to, inversion, beat tracking, and filtering. In accordance with certain embodiments of the invention, multiple data streams are provided and accessible for mapping from each incoming raw data stream. That is, a new data stream can be provided at different stages of processing or for different applied effects. For example, from a first raw data stream, a first effect can be applied and the output of the first effected data stream becomes a second data stream available for mapping. A second effect can be applied to the first effected data stream and even to the first raw data stream separate from the first effected data stream. Outputs of one or both of these second effected streams can then be provided for mapping. According to certain embodiments, the data processing for an existing data stream of a node recognized as existing on the network can be modified at any time. Furthermore, the raw data stream can be directly used for mapping without undergoing any processing.

For the mapping, a patch bay can be provided. In certain embodiments, mapping is provided via existing mapping programs. The existing mapping programs can be provided on a same computer as the subject processing module or spread across a network. Accordingly, the data streams may be output to a mapping program (or physical mapping device) directly within the computer (via processor/memory/busses) or external to the computer wired or wirelessly.

The outputs available for mapping can be any suitable programs or devices that can be used to support and/or augment a performance. For example, musical processes, FX processes, video projections, and lights can be controlled by the mapped data. The mapped data can be provided to the programs or devices wired or wirelessly.

In certain embodiments, available sensors can be algorithmically assigned to particular parameters by default, but the user is free to customize the mapping. Other, more open-ended programs used with embodiments of the subject wireless sensor network, such as general effects processing or light control may leave the mapping completely open to the user.

Multiple programs can be running simultaneously. For example, a user may interact with a video game, an effects processor, and stage lighting all at the same time.

In one embodiment, the processing module is implemented as computer executable instructions and may be stored on a computer readable medium. The processing module can be entirely or partially executed by a computer or device directly receiving the data from the data hub. The processing module can be instantiated by a computer such as described with respect to FIG. 1A. In certain embodiments, the processing module can be downloaded to the computer or device directly receiving the data from the data hub and executed. In another embodiment, the processing module is available via a cloud network and a user of a computer or device directly receiving the data from the data hub is provided with the user interfaces on a display of the computer or device while the steps of the processing module are executed remotely.

As previously described, embodiments of the invention are modular and reconfigurable. In one implementation, a kit is provided. The kit can include a plurality of sensor nodes, a receiver, and a computer readable medium (or media) containing computer executable instructions for using data received by one or more of the plurality of sensor nodes in controlling additional functions. For an implementation of an add-on kit, the kit can omit the receiver and only include one or more sensor nodes. A dowel may be included in certain kits containing a sensor node with a sonar sensor.

In certain embodiments, the computer readable medium can be omitted from the kit. In one such embodiment, the computer executable instructions can be accessed from a remote located and downloaded to be executed on a device capable of executing the instructions and receiving the data from the receiver. In another such embodiment, the computer executable instructions can have at least a portion executed remotely from the device receiving the data from the receiver (e.g., via cloud-based computing).

The particular sensor nodes in each kit can be arranged according to instrument. For example, a kit for a trombone can include at least two sensor nodes with a sensor capable of detecting force of a player's hand on the trombone, at least one sensor node with a sonar or other distance sensor for detecting movement of the slide, and at least one sensor node with an orientation and/or tilt sensor. Of course, certain kits can contain a selection of sensor nodes for generic applications.

Embodiments of the invention enable multi-media artistic expression—consciously, unconsciously, or subconsciously creating additional artistic control while conducting a performance with a first instrument or expression.

Often, sensing technology is invasive and may require physical alterations to an instrument that can be difficult or impossible to undo. Additionally, wires tethering to the computer and the size/weight of the hardware components tend to throw off the balance of the instrument and often interfere with traditional performance practice. Accordingly, certain embodiments of the subject sensor nodes provide minimal invasiveness to the artist/musician.

In addition, despite valuable advancements in wireless networking and microprocessors, along with a growing community of developers for embedded devices, the accessibility of this technology to the average classically trained musician largely remains out of reach. Currently, the technology is at a point that still requires at least hobbyist knowledge of microprocessors, programming and sensors to even begin to experiment with interactive systems. This limits the use of these systems almost exclusively to those who can acquire a certain level of technical expertise beyond music making. Accordingly, certain embodiments of the invention allow a user/performer/gamer/composer to create their own unique control interface with no required knowledge in programming or circuits.

A greater understanding of the present invention and of its many advantages may be had from the following examples, given by way of illustration. The following examples are illustrative of some of the methods, applications, embodiments and variants of the present invention. They are, of course, not to be considered in any way limitative of the invention. Numerous changes and modifications can be made with respect to the invention.

EXAMPLE

Sensor nodes of the example embodiments include a sensor node with a 3-axis accelerometer, a sensor node with a 6-DOF IMU, a sensor node with a 3-axis compass, a sensor node with a force-sensitive resistor, a sensor node with sonar, and a sensor node with a photoresistor. For the example prototype implementation, an IMU Analog Combo Board Razor 6DOF Ultra-Thin IMU was used to measure orientation, an Interlink Electronics 0.2" Circular FSR was used to measure force, and a Maxbotix LV-Maxsonar-EZ3 was used to measure distance to centimeter resolution. The example specific implementations are ultra-low power, and for certain embodiments, the nodes can run for a significant period of time (>8 hours) between charges using an onboard rechargeable battery.

For the prototypes, a microprocessor was used to receive the output from the sensor and control the transmitter in order to transmit data from the sensor node. With this microprocessor and transmitter, the sensor nodes transmit their data "as fast as possible" within the 1 MHz speed of the transmitter of the node. A 10 bit analog to digital converter was included.

For each example sensor node, the sensor node is assigned its own unique 1-byte address. The upper nibble indicates sensor type (sonar, IR, General analog, FSR, etc) and the lower nibble indicates sensor instance. Based on this example addressing protocol using four bits for the sensor type and four bits for the sensor instance of that sensor type, up to 16 different sensor types and 16 different instances of each sensor type can be acknowledged by the receiver hub.

The receiver hub running at 8 MHz receives all data and outputs it immediately to the serial bus connected to a computer (UART and/or USB can be utilized). The receiver hub includes a microprocessor. As data in the messages sent by the sensor nodes is received by the receiver, the messages are parsed by checking the pipe number, which indicates the device transmit length type and how many bytes of data to clock in. The bytes of received data are clocked out via the serial bus and everything in the buffer is cleared out in order to start the process over for each message received.

A software client is provided that allows a user to map all incoming sensor transmissions to various musical parameters or convert it into OSC (open sound control) messages to automatically interact with other music programs (such as MaxMSP, Ableton LIVE, and Propellerhead REASON) that can be running on the computer.

The software client running on the computer polls the data (at 40 Hz for the example implementation) and routes the data using the addressing scheme. The data is available as raw serial data. In addition, each sensor comes with a software module (downloadable from a site or provided on a computer-readable article of manufacture) where the user can process and map data using a data mixer and matrix map. The data can also be converted to other protocols using specialized modules: MIDI, OSC, or net UDP. This allows the data to be used in other music programs (such as Apple GARAGEBAND, Ableton LIVE, Abid PRO TOOLS, Csound, and Supercollider) or over the web to networked computers. These specialized modules can be turned on/off in the client software to reduce processing.

In the software client instructions are provided to display a variety of images and user interfaces for interaction by a user. For example, a sensor on the network can be represented by its icon, which appears in a list of available sensors on the display. The raw data of each sensor node on the network can be processed using dedicated software modules within the client software. For instance, clicking on an available sonar icon (see FIG. 3) opens up a processor module where the data is inverted and/or filtered, as well as routed to physical models (e.g., spring masses), or gesture recognition algorithms (see e.g., FIG. 5). The processed data output becomes available on the software client's mapper (see e.g., FIG. 6).

The mapper is a dynamic matrix map that keeps track of all available sensor output (x-axis) and all available music parameters (y-axis). In the data mapping interface such as shown in FIG. 6, the user is free to select which data output affects particular musical parameters. For example, a user with data input from an IMU sensor and 3 axes of tilt data can be provided the ability to control panning, volume, and reverb. The user is free to select which axis controls each parameter. The use of multiple sensor outputs is permitted to control a single parameter for complex multi-modal interactivity. Furthermore, a single sensor output may control multiple parameters. Simpler matrix maps (or even a single output) can be provided for applications, such as using a real instrument for a video game, where complex mapping is not necessary.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A wireless sensor network for musical instruments, comprising:
   at least one sensor node, each sensor node comprising a sensor and a transmitter for transmitting messages comprising data corresponding to an output of the sensor, the data including a sensor type, a unique identifier, and actual sensor data, each sensor node being configured to releasably attach to a musical instrument;
   a receiver hub comprising a receiver and a processor, the processor being configured to parse the messages from the at least one sensor node received by the receiver and output the parsed messages to a computer implemented processing module; and
   the processing module, wherein the processing module receives the parsed messages, determines from the parsed messages a type and instance of the at least one sensor node; provides data processing of data from the parsed messages; provides data mapping of data streams from the parsed messages to particular outputs; and outputs the data streams from the parsed messages to the particular outputs according to the data mapping.

2. The wireless sensor network for musical instruments according to claim 1, wherein the processing module further calibrates the data from the parsed messages.

3. The wireless sensor network for musical instruments according to claim 2, wherein the processing module calibrates the data from the parsed messages by scaling the data to a predictable range of floating point values based on moveable min and max parameters.

4. The wireless sensor network for musical instruments according to claim 1, wherein the processing module provides the data processing of data from the parsed messages by creating at least one data stream from the parsed messages of each of the at least one sensor node and providing a user interface to select particular effects and processes to affect the at least one data stream, and
   wherein separate data streams are provided for at least one data stream having no data processing and an affected data stream, the separate data streams being available for the data mapping.

5. The wireless sensor network for musical instruments according to claim 1, wherein the processing module provides data mapping of the data streams from the parsed messages to particular outputs by providing a user interface enabling patching of a selected data stream to one or more of the particular outputs.

6. The wireless sensor network for musical instruments according to claim 1, wherein the receiver hub is configured to receive messages on a first channel, wherein the sensor node and the receiver hub are configured to perform a discovery mode in which the transmitter transmits a test message at frequencies for different channels until the transmitter transmits the test message at the first channel, the sensor node subsequently transmitting the messages on the first channel.

7. A musical instrument wireless sensor network kit comprising:
   at least one wireless sensor node configured for attachment to a musical instrument and for transmitting messages including a sensor type, a unique identifier, and actual sensor data;
   a receiver hub for receiving data from the at least one wireless sensor node, parsing the data, and providing the parsed data as a parsed data message to a computing system; and
   a computer readable medium comprising executable instructions for:
      creating a new instance of the wireless sensor node available in a user interface when the wireless sensor node is detected from a received parsed data message;
      providing a raw data stream for the new instance from the received parsed data message in the user interface;
      updating the raw data stream in the user interface upon receipt of a subsequent parsed data message corresponding to the wireless sensor node;

performing data processing for the raw data stream; and
mapping the raw data stream and/or a data processed raw data stream to one or more particular outputs.

8. The kit according to claim 7, wherein instructions for performing the data processing for the raw data stream comprise instructions for providing the raw data stream to a digital data workstation.

9. The kit according to claim 7, wherein instructions for mapping the raw data stream and/or the data processed raw data stream to the one or more particular outputs comprises instructions for providing a patchbay user interface.

10. The kit according to claim 7, wherein the at least one wireless sensor node comprises a first wireless sensor node having an orientation sensor and a second wireless sensor node having a force sensor.

\* \* \* \* \*